US010029429B2

(12) United States Patent
Eckhardt et al.

(10) Patent No.: US 10,029,429 B2
(45) Date of Patent: Jul. 24, 2018

(54) APPARATUS FOR SEALING AND/OR INFLATING OBJECTS AND SELF-CLOSING SCREW COUPLING

(71) Applicant: SUMITOMO RUBBER INDUSTRIES LTD., Kobe-shi, Hyogo (JP)

(72) Inventors: Arnold Eckhardt, Rantsadt (DE); Klaus Lowitz, Reiskirchen (DE)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 96 days.

(21) Appl. No.: 15/034,939

(22) PCT Filed: Nov. 21, 2014

(86) PCT No.: PCT/JP2014/005859
§ 371 (c)(1),
(2) Date: May 6, 2016

(87) PCT Pub. No.: WO2015/079667
PCT Pub. Date: Jun. 4, 2015

(65) Prior Publication Data
US 2016/0288434 A1 Oct. 6, 2016

(30) Foreign Application Priority Data

Nov. 28, 2013 (DE) .................. 10 2013 224 423
Dec. 23, 2013 (DE) .................. 10 2013 114 853

(51) Int. Cl.
*B29C 73/16* (2006.01)
*F16K 15/02* (2006.01)
(Continued)

(52) U.S. Cl.
CPC .......... *B29C 73/166* (2013.01); *B60C 29/064* (2013.01); *B60S 5/04* (2013.01);
(Continued)

(58) Field of Classification Search
CPC .................................................. B29C 73/166
(Continued)

(56) References Cited

U.S. PATENT DOCUMENTS 6,964,284 B2 * 11/2005 Eckhardt ............... B29C 73/166
141/100
7,370,678 B2 * 5/2008 L.ae butted.tgaard
............... B29C 73/166
141/100
(Continued)

FOREIGN PATENT DOCUMENTS

DE   10 2011 018 927 A1   10/2012
DE   20 2013 101 644 U1    8/2013
EP        2 123 432 A1    11/2009

OTHER PUBLICATIONS

International Search Report issued in PCT/JP2014/005859 dated Jun. 22, 2015.
(Continued)

Primary Examiner — Timothy L Maust
(74) Attorney, Agent, or Firm — Birch, Stewart, Kolasch & Birch, LLP

(57) ABSTRACT

An apparatus for sealing and/or inflating objects, in particular vehicle tires, having a housing (1) in which a gas pressure source, in particular a compressed air source, is accommodated, and having a container with sealant which can be coupled to the housing via coupling means (18,20) provided at the container, on the one hand, and at the housing, on the other hand, to establish a state of use,—wherein at least two different coupling means (9,10) are provided at the housing for reducing the manufacturing costs which are each con-
(Continued)

figured in order to cooperate with corresponding coupling means (18, 20) of one of at least two types of containers which differ from one another with respect to the design of their coupling means.

15 Claims, 4 Drawing Sheets

(51) Int. Cl.
  *F16K 15/14* (2006.01)
  *B60C 29/06* (2006.01)
  *B60S 5/04* (2006.01)
  *F16K 15/20* (2006.01)
  *B29L 30/00* (2006.01)

(52) U.S. Cl.
  CPC .......... *F16K 15/026* (2013.01); *F16K 15/144* (2013.01); *F16K 15/20* (2013.01); *B29L 2030/00* (2013.01)

(58) Field of Classification Search
  USPC .......... 141/38, 100, 363, 365, 366, 373, 375
  See application file for complete search history.

(56) References Cited

U.S. PATENT DOCUMENTS

| | | | | |
|---|---|---|---|---|
| 8,684,046 | B2* | 4/2014 | Kojima | B29C 73/166 |
| | | | | 141/38 |
| 8,746,293 | B2* | 6/2014 | Chou | B60S 5/04 |
| | | | | 141/38 |
| 8,752,595 | B2* | 6/2014 | Marini | B29C 73/166 |
| | | | | 141/38 |
| 9,027,608 | B2* | 5/2015 | Chou | B29C 73/166 |
| | | | | 141/38 |
| 9,168,798 | B2* | 10/2015 | Eckhardt | B29C 73/166 |
| 2011/0192492 | A1 | 8/2011 | Kanenari et al. | |
| 2013/0220483 | A1* | 8/2013 | Eckhardt | B29C 73/166 |
| | | | | 141/38 |
| 2013/0284312 | A1 | 10/2013 | Chou | |

OTHER PUBLICATIONS

Written Opinion of the International Searching Authority issued in PCT/JP2014/005859 dated Jun. 22, 2015.

* cited by examiner

APPARATUS FOR SEALING AND/OR INFLATING OBJECTS AND SELF-CLOSING SCREW COUPLING

TECHNICAL FIELD

The present invention relates to an apparatus for sealing and/or inflating objects, in particular vehicle tires, having a housing in which a gas pressure source, in particular a compressed air source, is accommodated, and having a container with sealant which can be coupled to the housing via coupling means provided at the container, on the one hand, and at the housing, on the other hand, for establishing a state of use. The present invention further relates to a self-closing screw coupling for hoses in accordance with the preamble of claim 16.

BACKGROUND ART

Such apparatus are generally known, for example as flat-tire repair kits, and are carried in a motor vehicle as a replacement for a spare wheel. They preferably comprise two modes of operation.

To increase an internal pressure of a tire, an outlet of the compressed air source is directly connected to a tire valve via a hose and the tire is inflated by the generated compressed air.

In the case of a flat tire, in contrast, the inlet of the container is connected to the outlet of the compressed air source and the outlet of the container is connected to the tire valve via a hose. The sealant is conveyed out of the container and into the damaged tire by the compressed air. The tire is subsequently inflated to a pressure sufficient for driving by the compressed air source.

For space reasons, the housing with the pressure source, on the one hand, and the container, on the other hand, are stored separately in the vehicle.

In the event of a flat tire, the container is then fastened to the housing via the coupling means to ensure a secure standing of the container and an orientation of the container suitable for the introduction of the sealant into the tire.

At the end of the repair, the container can be separated from the housing again.

Tire repair kits are increasingly being provided in motor vehicles instead of spare wheels.

Such tire repair kits comprise a compressed air source, a sealant container which can be connected to the compressed air source to expel the sealant out of the container via the compressed air, and a compressed air hose for connecting the container outlet to a tire valve.

A compressed air hose can also be directly connectable to the compressed air source in order only to pump up a tire.

Such compressed air hoses typically have a self-closing screw coupling to prevent a discharge of the sealant as long as the compressed air hose is still not yet connected to the tire valve.

In addition, the screw head is rotatable about a longitudinal hose axis with respect to the hose connector piece to allow a comfortable screwing of the screw coupling onto the tire valve.

SUMMARY OF INVENTION

Technical Problem

It is the underlying object of the invention to reduce the costs of such a flat-tire repair kit.

Solution to Problem

This object is satisfied with an apparatus of the initially named kind in that at least two different coupling means are provided at the housing which are each configured to cooperate with corresponding coupling means of one of at least two types of containers which differ from one another with respect to the design of their coupling means.

One and the same gas pressure source can be used with different types of containers due to the provision of at least two different coupling means. A separate gas pressure source housing does not therefore have to be provided for every type of container, whereby the costs can be reduced. In addition, the area of use of the gas pressure source with housing can thereby be increased.

It is preferred if the different coupling means are provided in the same region of the housing, in particular in the region of a common connection section of the housing for the different containers.

The handling of the flat-tire repair kit is thereby simplified. Furthermore, the connection of the different containers to the gas pressure source can be simplified in that the same connection is used for different container types or at least connection lines to the gas pressure source are used in common for the connections of different containers.

A simple construction design comprises configuring the connection section as a cut-out in the housing.

This is also advantageous for the handling, that is for the coupling and decoupling of the container.

A particularly simple handling results when the cut-out is configured as an indentation, preferably a U-shaped indentation, at the marginal side, in particular in a corner region of the housing. The container can then, for example, simply be pushed or plugged onto the housing.

Furthermore, the different coupling means can also comprise common parts, for example common guide means. The costs can also thereby be lowered.

The coupling means of at least one container type are preferably formed in an extraction unit of the container in which the gas inlet and/or the outlet of the container are provided.

The corresponding container can thereby be of a comparatively simple configuration, in particular as a simple bottle with a bottleneck.

Only the extraction units of the containers preferably differ from one another. One and the same container can thereby advantageously be combined with different extraction units. The containers can thereby be manufactured particularly inexpensively.

In accordance with a special embodiment of the invention, the coupling means comprise at least one type of latch hook. The fastening means can preferably comprise two flexible hooks which cooperate with a peripheral section of the container or of an extraction unit of the container. A stable fastening hereby results with a simultaneously simple handling.

In accordance with another special embodiment of the invention, the coupling means comprise at least one type of cut-out. The cut-outs in this respect preferably cooperate with latch hooks which are provided at a peripheral section of the container or of an extraction unit of the container. A stable coupling and a simple handling also thereby result.

In accordance with a further special embodiment of the invention, the container of at least one type has a gas inlet which can be coupled via a plug-in coupling to the gas outlet of the gas pressure source accommodated in the housing.

The connection of the container to the gas pressure source is thereby particularly simple and can in particular be carried out together with the coupling of the container to the housing of the gas pressure source.

In accordance with another special embodiment of the invention, the container of at least one type has a gas inlet which can be coupled via a hose or the like to the gas outlet of the gas pressure source. An inexpensive connection type thus results between the container and the gas pressure source.

The housing of the gas pressure source is preferably configured as a flat parallelepiped. Such a housing can be manufactured inexpensively and can be easily accommodated in a motor vehicle, for example in the trunk.

The object is further satisfied by a self-closing screw coupling having the features of claim 16 and in particular in that the spring and the closure part are configured in one piece with one another. Thus a self-closing screw coupling of the initially named kind is improved and it is in particular inexpensive in manufacture and assembly.

A component is saved by the one-piece configuring of the spring and the closure part. This makes both the manufacture and the assembly less expensive.

In accordance with a preferred embodiment of the invention, the spring includes a double helix. An advantageous spring behavior thereby results with small space requirements for the spring.

The spring and the closure part are further preferably manufactured from plastic. This is likewise inexpensive in manufacture and reduces the weight of the screw coupling.

In accordance with a further embodiment of the invention, the hose connector piece has a section which is expanded radially with respect to the center longitudinal axis of the connector piece and has a receiver for the spring.

Sufficient construction space for the spring is hereby provided, on the one hand, and the spring is thereby advantageously integrated into the hose connector piece, on the other hand.

It is further advantageous if the closure part is configured as a plunger having a disk-shaped section facing the spring and having a cylindrical section which adjoins it and has a smaller outer diameter with respect to the disk-shaped section and the outer diameter of the spring.

A relatively large throughflow passage for the sealant is hereby provided within the spring and said sealant can thus flow through the screw coupling in a largely unimpeded manner. Furthermore, good spring properties thereby result with a small tilt inclination of the spring. The disk-shaped section has the sealing surface of the closure part, whereas the cylindrical section serves for guiding the closure part on the opening and closing of the valve.

It is further advantageous if the closure part has a jacket surface at which a plurality of axially extending ribs are arranged. The stiffness of the closure part is hereby advantageously increased.

In accordance with a further embodiment of the invention, which is also claimed per se, one of the mutually cooperating counter-surfaces of the closure part and of the valve seat is inclined with respect to the other counter-surface.

An only linear contact results between the two counter-surfaces due to this inclination. The sealing effect is thereby advantageously increased.

The counter-surface of the valve seat is in particular inclined relative to the center longitudinal axis of the screw coupling. The desired linear contact can thus be realized in an advantageous construction manner.

The valve seat is further preferably formed at an inner surface of the screw head. This is also of constructional advantage and avoids an additional component.

A seal, in particular a sealing ring, can be arranged between the closure part and the screw head. The sealing effect of the valve can thereby be improved. The seal can comprise typical sealing materials, for example rubber.

In accordance with a further embodiment of the invention, which is likewise claimed per se, the screw head is connected to the hose connector piece via a latch connection which allows a rotation of the screw head connected to the hose connector piece about the screw axis with respect to the hose connector piece.

The latch connection allows a fast and simple assembly of the screw coupling. In this respect, the latch connection can in particular be elastic so that it is also releasable again, for example to replace the spring or to remove dirt which has penetrated.

The latch connection preferably has a plurality of latch hooks which extend radially inwardly from an inner surface of the screw head. A secure and smooth rotationally symmetrical latch connection can thereby be provided.

The latch connection further preferably comprises a peripheral groove which is formed at an outer peripheral surface of the hose connector piece. The peripheral groove advantageously forms the counter-surface for the latch hooks and allows a rotation of the screw head with respect to the hose connector piece in the latched state.

The peripheral groove is in particular formed at a radially expanded section of the hose connector piece which faces the screw head. The diameter of the peripheral groove is thereby comparatively large, which is advantageous for the rotation of the screw head with respect to the hose connector piece.

The expanded section of the hose connector piece particularly preferably projects at least partly into the screw head. A compact hose coupling is thereby provided in which the expanded section of the hose connector piece is additionally protected.

BRIEF DESCRIPTION OF DRAWINGS

Embodiments of the invention are shown in the drawing and will be described in the following. There are shown, schematically in each case FIG. 1 a perspective view of the housing of the gas pressure source of an apparatus in accordance with the invention.

DESCRIPTION OF EMBODIMENTS

Figure 1:
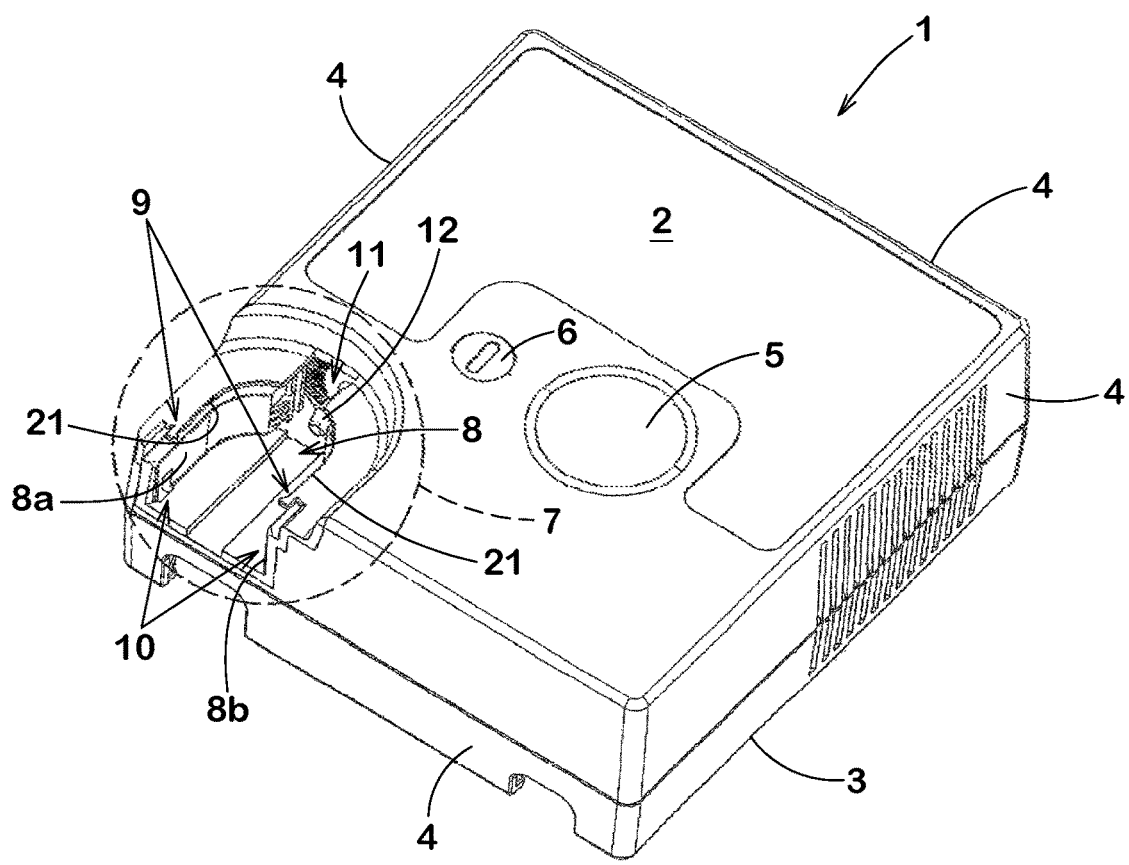

The apparatus shown in the drawings comprises a housing 1 in which a gas pressure source, in particular a compressor, is accommodated which can, however, not be seen in the drawings.

The housing is configured as a flat parallelepiped with a substantially rectangular upper side 2, a lower side 3 of the same design and four narrow side walls 4.

A display apparatus 5, in particular a pressure display, and an actuation button 6, in particular a depressurization button, are indicated at the upper side 2.

In a corner region, the housing 1 is provided with a cut-out 7 which comprises a U-shaped indentation 8. The U-shaped indentation 8 serves for the introduction of a corresponding coupling section of the associated container types.

It is provided with two types of coupling means for the coupling of containers of two different types, namely, on the one hand, to two mutually oppositely arranged latch hooks 9 and, on the other hand, to two likewise mutually oppositely disposed latch recesses 10.

Both the latch hooks 9 and the latch recesses 10 are arranged in the region of the two limbs 8a, 8b of the U-shaped indentation 8, with the latch hooks 9 being located above the latch recesses 10.

The cut-out 7 is not only configured as a common connection section for the coupling of containers of two different types, but also as a connection section for coupling the gas outlet of the gas pressure source located in the housing 1 to the gas inlet of an associated container.

For this purpose, an opening 11 toward the interior of the housing 1 is provided in the rear end region of the indentation 8 and a connector stub 12 of the gas inlet of the gas pressure source extends into said opening. A correspondingly formed plug-in coupling which is provided at the gas inlet of an associated container can be coupled to the connector stub 12.

The arrangement is provided in this respect such that the coupling between the connector stub 12 and the associated plug-in coupling takes place simultaneously with the latching of latch hooks provided at a container into the latch recesses 10.

It is thus ensured that the gas connection to the container is simultaneously also established with a latched container.

Figure 2:
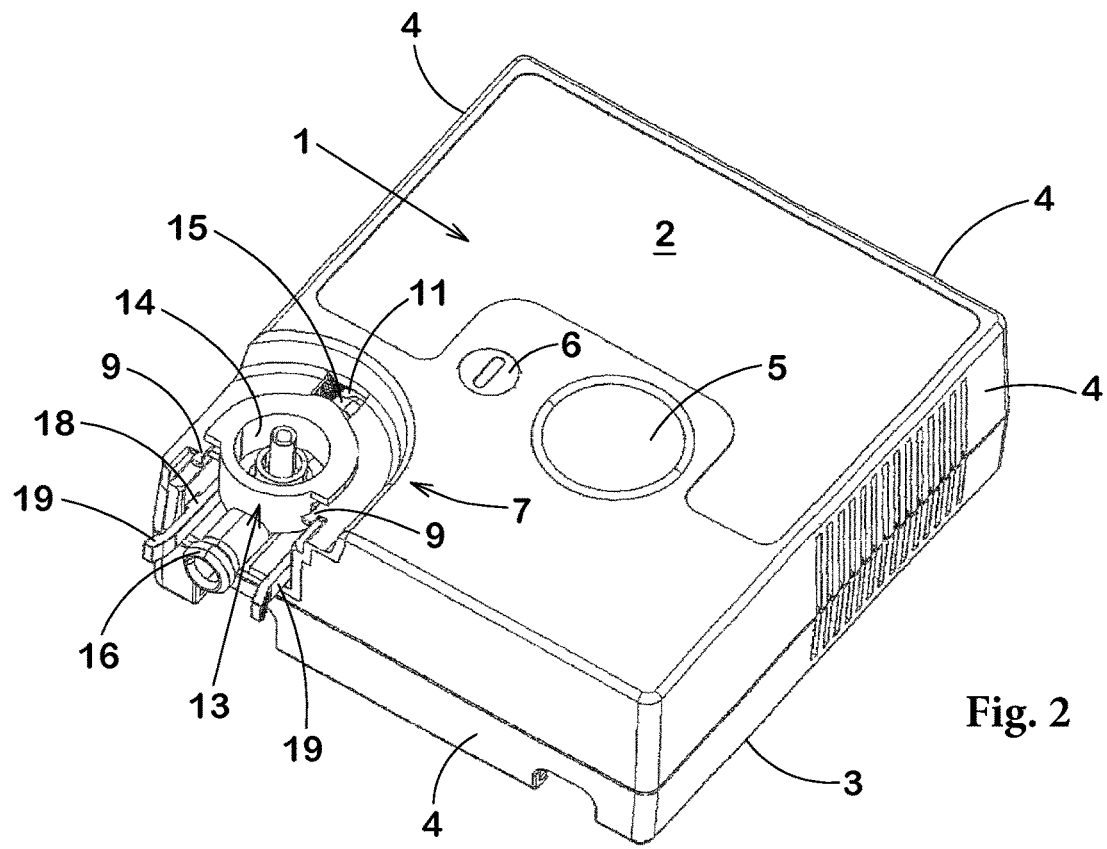
FIG. 2 the housing of FIG. 1 with an inserted extraction unit of a container of a first type.
Figure 3:
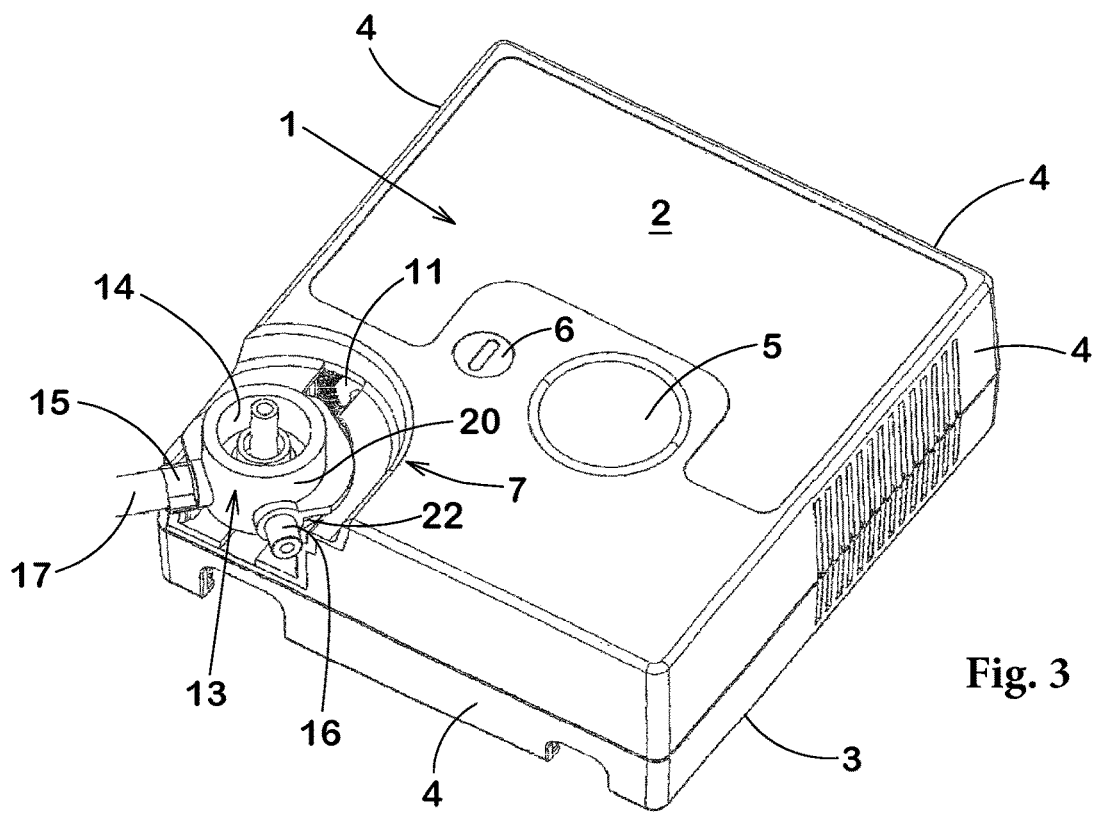
FIG. 3 the housing of FIG. 1 with an inserted extraction unit of a container of a second type.

In the embodiments of the invention shown in FIGS. 2 and 3, the gas inlet and the outlet of the container with sealant are each formed in an extraction unit 13.

While the containers of both embodiment variants not shown in FIGS. 2 and 3 can be of the same design as one another and can, for example, be screwed via a neck provided with an external thread into a cylindrical recess 24 of the extraction unit 13 formed with a corresponding internal thread, the two extraction units 13 of the two embodiments of FIG. 2 are different from one another.

The extraction units 13 of the two embodiment variants of FIGS. 2 and 3 also have the coupling means for coupling the container to the housing 1 of the gas pressure source beside the gas inlet and the outlet for the containers.

In the embodiment shown in FIG. 2, the gas inlet 15 and the outlet 16 of the extraction unit 13 are provided at mutually remote sides of the extraction unit 13. They are therefore arranged at an angle of 180 degrees with respect to one another and face away from one another.

The gas inlet 15 is configured in this embodiment as a plug-in coupling which can be coupled to the connector stub 12 of the gas pressure source. The outlet 16 is configured as a hose connection to which a commercial hose can be connected whose other end can be connected to a tire valve, in particular via a so-called VG8 coupling.

In the embodiment of FIG. 3, the gas inlet 15 and the outlet 16 are provided at the extraction unit 13 at an angle of 90 degrees with respect to one another. The gas inlet 15 is here configured as a hose connection to which a compressed gas hose 17 can be connected whose other end is or can be connected to the gas pressure source in the housing 1.

For this purpose, the gas pressure source has a suitable gas outlet which is not shown in the drawings and to which the compressed gas hose 17 can be or is connected.

The outlet 16 of the extraction unit 13 is configured in this embodiment as a hose connection again to which a hose of a conventional kind leading to a tire can be connected.

The coupling means provided at the extraction units 13 of the embodiments of FIGS. 2 and 3 for the coupling of the container to the housing 1 are likewise configured differently from one another.

The coupling means of the embodiment of FIG. 2 cooperate with the latch recesses 10 of the connection section 7 of the housing 1. For this purpose, the coupling means of the extraction unit 13 are configured as resilient latch hooks 18 which are attached to two sides of the extraction unit 13 which face away from one another and which are each disposed opposite the lambs 8a and 8b of the U-shaped indentation 8 with an extraction unit 13 introduced into the connection section 7.

The resilient latch hooks 18 each have an extension 19 which respectively project outwardly beyond the housing 1 with an extraction unit 13 inserted into the connection section 7 of the housing 1 and are configured as gipping elements. The latch hooks 18 can be unlatched from the cut-outs 10 by moving the two extensions 19 toward one another to release the extraction unit 13, and with it the sealant container, from the housing 1. This can be done, for example, by pressing together the two extensions 19 between the thumb and index finger.

In the embodiment shown in FIG. 3, the latch hooks 9 cooperate with the extraction unit 13 in the limb region 8a, 8b of the U-shaped indentation 8.

The extraction unit 13 has for this purpose a cylindrical section 20 which is comprised of and engaged behind by the two latch hooks 9 with an extraction unit 13 inserted into the connection section 7.

The latch hooks 9 and/or the cylindrical section 20 of the extraction unit 13 have such an elasticity that a snap-in connection results between the extraction unit 13 and the latch hook 9. The extraction unit 13 can accordingly again be released from the housing 1 against the snap-in force.

As can in particular be recognized in FIG. 1, the latch hooks 9 are extended inwardly away from the margin of the housing 1 in the manner of a rib 21 in each case. These ribs 21 with corresponding grooves 22 1 at the extraction unit 13 can serve for guiding the extraction unit 13 on the coupling with and decoupling from the housing.

In addition, the ribs 21 together with the associated grooves 22 prevent a relative movement between the extraction unit 13 and the housing 1 differing from the coupling movement or decoupling movement.

The extraction unit 13 of the embodiment of FIG. 2 can also be provided with corresponding grooves 22 which cooperate with the ribs 21 although the latch hooks 9 for the coupling of the extraction unit 13 of this embodiment do not have any meaning.

Figure 4:
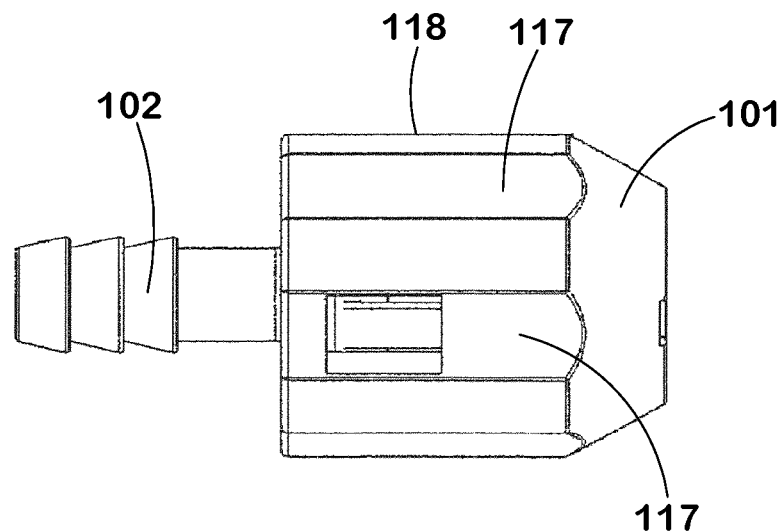
FIG. 4 a side view of a screw coupling in accordance with the invention.
Figure 5:
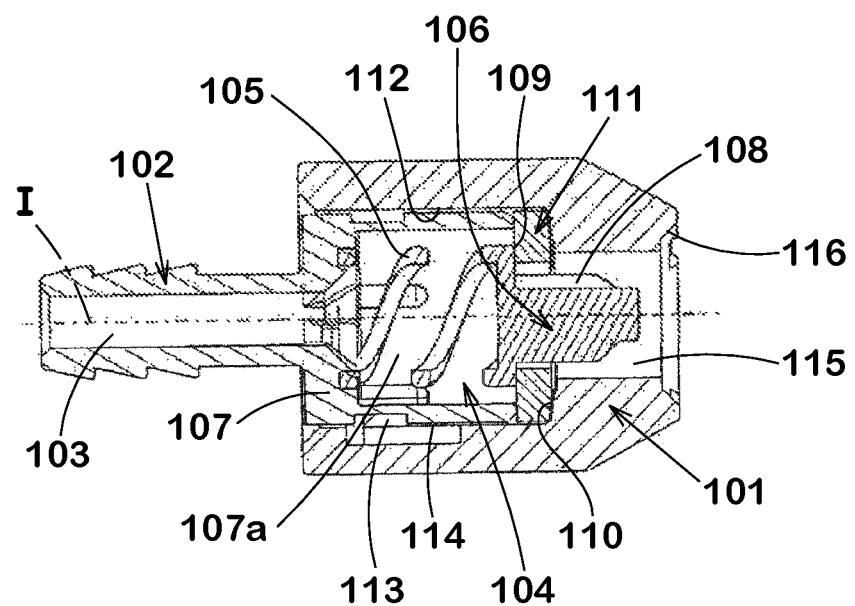
FIG. 5 a longitudinal section through the screw coupling of FIG. 4.
Figure 6:
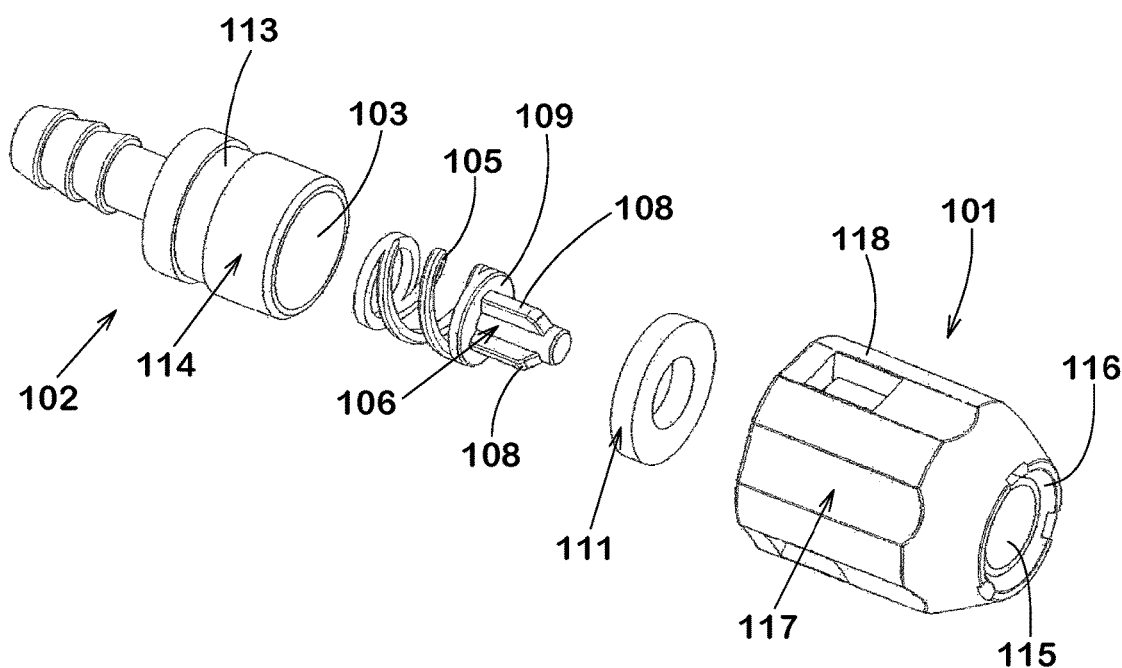
FIG. 6 an exploded representation of the screw coupling of FIG. 4.

The screw coupling shown in FIGS. 4-6 comprises a screw head 101, a hose connector piece 102 rotatably connected to the screw head 101 about a longitudinal axis I and a valve 104 arranged in a throughflow passage 103 of the screw coupling and having a spring 105 and a closure part 106 configured as a plunger.

As can be seen in FIGS. 5 and 6, the spring 105 is formed in one piece with the closure part 106, and indeed in particular from plastic. The closure part 106 has a disk-shaped section 106a and a cylindrical section 106b with a reduced diameter.

As can likewise be seen in FIGS. 5 and 6, the spring 105 has a double helix and is accommodated in a radially expanded section 107 in a receiver 107a of the hose connector piece 102. It can likewise be recognized that the outer diameter of the spring 105 is larger than the outer diameter of the cylindrical section 106b of the closure part 106. It can in particular be recognized in FIG. 6 that the closure part 106 is provided with three axially extending ribs 108 at the jacket surface of its cylindrical section 106b.

An end surface of the disk-shaped section 106a of the closure part 106 remote from the double helix of the spring 105 is configured as a sealing surface 109 of the valve 104. The counter-surface of the valve, the valve seat, is formed at the oppositely disposed inner surface 110 of the screw head 101.

A sealing ring 111 by which the sealing effect is increased is arranged between the end surface 109 and the counter-surface 110. The sealing effect is likewise increased in that the counter-surface 110 is inclined relative to the center longitudinal axis I of the screw coupling, as can in particular be recognized in FIG. 5.

A linear contact thereby results along a circular line between the sealing surfaces 108, 110 or between the seal 111 and the counter-surface 110.

It can above all in turn be recognized in FIG. 5 that the screw head 101 completely receives the expanded section 107 of the hose connector piece 102 in the assembled state of the screw coupling. For this purpose, the screw head 101 has a cup-shaped cut-out 112 at its side facing the hose connector piece 102, in which cut-out the expanded section 107 of the hose connector piece 102 is inserted with small clearance.

The screw head 101 and the hose connector piece 102 are in this respect secured via a latch connection with respect to an unintentional release.

For this purpose, the screw head 101 is provided in the region of its cut-out 112 with a plurality of, for example three, radially inwardly projecting latch hooks which are not shown in the drawing.

The latch hooks engage into an oppositely disposed peripheral groove 113 which is provided in the outer surface 114 of the expanded section 107 of the hose connector piece 102. The latch hooks are in particular resilient so that the screw head 101 can easily be pushed onto the expanded section 107 and, if desired, can also be released from it again.

At its side remote from the hose connector piece 102, the screw head 101 is in another respect provided with an internal thread 115, for example with a VG8 thread, to be able to screwed onto a typical tire valve.

The screwing on is facilitated by an introduction chamfer 116 at the end face of the screw head 101 remote from the hose connector piece 102.

Finally, the screw head 101 has, as can in particular be recognized in FIG. 6, longitudinal grooves 117 arranged distributed over the outer periphery on its outer peripheral surface 118 to facilitate a rotation of the screw head 101 with respect to the hose connector piece 102. A screw coupling is thus provided overall which is inexpensive to manufacture, easy to assemble and simple to handle.

For assembly, the spring 105 with the closure part 106 is inserted into the receiver 107a and the seal 111 is inserted into the receiver 112. The screw head 101 is then pushed over the hose connector piece 102, with the three latch hooks latching into the groove 113.

On connecting the screw coupling to a tire valve, the closure part 106 biased with respect to the valve seat 110 by the spring 105 is pushed through the valve body of the tire valve in the direction of the hose connector piece 102.

The disk-shaped section 106a of the closure part 106 thereby raises from the valve seat 110 and releases a through-flow cross-section for the sealant or compressed air.

On the removal of the screw coupling from the tire valve, the closure part 106 is again biased with respect to the valve seat 110 by the spring 105 and the screw coupling is sealed.

An increased pressure action arises by the inclination of the valve seat toward the center longitudinal axis I of the screw coupling and thereby a good sealing even with a relatively small spring force. A small spring is thereby sufficient.

REFERENCE SIGNS LIST 1 housing
2 upper side of 1
3 lower side of 1
4 narrow side of 1
5 display apparatus
6 actuating button
7 connection section
8 U-shaped cut-out
8a limb of 8
8a limb of 8
9 latch hook
10 latch recess
11 opening
12 connector stub
13 extraction unit
14 recess
15 gas inlet
16 outlet
17 compressed air hose
18 latch hook
19 extension of 18
20 cylindrical section
21 rib
22 groove
101 screw head
102 hose connector piece
103 throughflow passage
104 valve
105 spring
106 closure part
106a disk-shaped section of 6
106b cylindrical section of 6
107 expanded section of 2
107a receiver
108 rib
109 sealing surface of 6
110 sealing surface of 1/valve seat
111 seal
112 receiver
113 groove
114 outer peripheral surface of 7
115 internal thread
116 introduction chamfer
117 longitudinal groove
118 outer peripheral surface of 1
I center longitudinal axis

The invention claimed is:

1. An apparatus for sealing and/or inflating vehicle tires, having a housing (1) in which a gas pressure source is accommodated, and having a container with sealant which can be coupled to the housing (1) via a first coupling means (18) and a second coupling means (20) provided at the container for establishing a state of use, characterized in that
at least two different coupling means, which are a third coupling means (9) and a fourth coupling means (10), are provided at the housing (1),
the first coupling means (18) corresponds to one of at least two types of containers which differ from one another with respect to the design of their coupling means (18, 20),
the second coupling means (20) corresponds to another one of the at least two types of containers,
the third coupling means (9) is configured to cooperate with the second coupling means (20) and not with the first coupling means (18), and
the fourth coupling means (10) is configured to cooperate with the first coupling means (18) and not with the second coupling means (20).

2. An apparatus in accordance with claim 1, characterized in that
the at least two different coupling means (9, 10) are provided in the same region (7) of the housing (1).

3. An apparatus in accordance with claim 1, characterized in that
the at least two different coupling means (9, 10) are provided in the region of a common connection section (7) of the housing (1) for the different containers, which connection section (7) also serves for the connection of the container to the gas pressure source.

4. An apparatus in accordance with claim 3, characterized in that
the connection section (7) is configured as a cut-out in the housing (1).

5. An apparatus in accordance with claim 4, characterized in that
the cut-out is configured as an indentation (8) at a marginal side of the housing (1).

6. An apparatus in accordance with claim 1, characterized in that
the at least two different coupling means (9, 10, 21) comprise common parts (21).

7. An apparatus in accordance with claim 1, characterized in that
the first or second coupling means (18, 20) of at least one container type is formed in an extraction unit (13) of the container in which extraction unit the gas inlet (15) and/or the outlet (16) of the container is/are provided.

8. An apparatus in accordance with claim 7, characterized in that
only the extraction units (13) of the containers differ from one another.

9. An apparatus in accordance with claim 1, characterized in that
the third coupling means (9, 10) comprise at least one type of latch hook (9).

10. An apparatus in accordance with claim 9, characterized in that
the third and fourth coupling means comprise two flexible latch hooks (9) which cooperate with a peripheral section (20) of the container or of an extraction unit (13) of the container.

11. An apparatus in accordance with claim 1, characterized in that the at least two different coupling means comprise at least one type of cut-out (10).

12. An apparatus in accordance with claim 11, characterized in that
the cut-outs (10) cooperate with latch hooks (18) which are provided at a peripheral section (20) of the container or of an extraction unit (13) of the container.

13. An apparatus in accordance with claim 1, characterized in that
the container has a gas inlet (15) which is provided with a plug-in coupling which can be coupled to a corresponding connector stub (12) of the gas pressure source.

14. An apparatus in accordance with claim 1, characterized in that
the container has a gas inlet (15) which can be coupled via a hose (17) to a gas outlet of the gas pressure source.

15. An apparatus in accordance with claim 1, characterized in that
the housing (1) is formed as a flat parallelepiped.

* * * * *